US009387396B2

(12) United States Patent
Hijmans et al.

(10) Patent No.: US 9,387,396 B2
(45) Date of Patent: Jul. 12, 2016

(54) EXERCISE SYSTEM AND CONTROLLER

(75) Inventors: Juha Markus Hijmans, Christchurch (NZ); Marcus James King, Christchurch (NZ)

(73) Assignee: Callaghan Innovation, Lower Hutt (NZ)

( * ) Notice: Subject to any disclaimer, the term of this patent is extended or adjusted under 35 U.S.C. 154(b) by 248 days.

(21) Appl. No.: 13/636,479

(22) PCT Filed: Mar. 23, 2011

(86) PCT No.: PCT/NZ2011/000038
§ 371 (c)(1),
(2), (4) Date: Nov. 9, 2012

(87) PCT Pub. No.: WO2011/119052
PCT Pub. Date: Sep. 29, 2011

(65) Prior Publication Data
US 2013/0059696 A1    Mar. 7, 2013

(30) Foreign Application Priority Data

Mar. 23, 2010 (NZ) ........................................ 584146

(51) Int. Cl.
*A63F 9/24* (2006.01)
*A63F 13/98* (2014.01)
(Continued)

(52) U.S. Cl.
CPC .............. *A63F 13/02* (2013.01); *A61H 1/0274* (2013.01); *A63B 21/0004* (2013.01);
(Continued)

(58) Field of Classification Search
CPC ..... F16B 4/004; A63F 13/02; A63B 21/0004; A63B 21/072; A63B 21/4035; A61H 1/0274

USPC ...................................................... 463/47, 37
See application file for complete search history.

(56) References Cited

U.S. PATENT DOCUMENTS 4,422,640 A * 12/1983 Tamarkin ......................... 463/47
4,909,514 A *  3/1990 Tano ........................... 273/148 B
(Continued)

FOREIGN PATENT DOCUMENTS

JP    S60-020222       2/1985
JP    2008-206638 A    9/2008
(Continued)

OTHER PUBLICATIONS

International Patent Application No. PCT/NZ2011/000038: International Search Report dated Jun. 9, 2011, 3 pages.
(Continued)

*Primary Examiner* — Corbett B Coburn
(74) *Attorney, Agent, or Firm* — Baker & Hostetler LLP

(57) ABSTRACT

An exercise system/device for exercising a user's upper limb is described. The exercise system/device is intended for use in rehabilitating patients suffering hemiparesis that causes one upper limb to be at least partially paralyzed. For example, the exercise system/device can be used for neuroplastic retraining rehabilitation techniques for enabling patients to regain control of their paralyzed upper extremities, including shoulders, elbows, wrists and fingers, but primarily their shoulders and elbows via larger arm movements. This is achieved through the use of an elongate handle and a motion sensing device associated with the handle for communicating the user's movements of the handle to a gaming system. Although the exercise system/device is primarily for rehabilitation of patients suffering hemiparesis, it may also be used by any person for bilateral training and exercising upper limbs.

8 Claims, 11 Drawing Sheets

(51) Int. Cl.
  *A61H 1/02* (2006.01)
  *A63B 21/00* (2006.01)
  *A63B 21/072* (2006.01)
  *A63B 23/035* (2006.01)
  *A63B 21/06* (2006.01)
  *A63B 21/075* (2006.01)
  *A63B 24/00* (2006.01)

(52) U.S. Cl.
  CPC .......... *A63B 21/072* (2013.01); *A63B 21/4035* (2015.10); *A63B 23/03525* (2013.01); *A61H 2201/1276* (2013.01); *A61H 2201/1638* (2013.01); *A61H 2201/5064* (2013.01); *A61H 2201/5092* (2013.01); *A61H 2201/5097* (2013.01); *A61H 2205/06* (2013.01); *A63B 21/0602* (2013.01); *A63B 21/075* (2013.01); *A63B 2024/0096* (2013.01); *A63B 2220/803* (2013.01); *A63B 2220/806* (2013.01); *A63B 2220/89* (2013.01); *A63B 2225/50* (2013.01); *A63F 2300/1012* (2013.01); *A63F 2300/1043* (2013.01); *A63F 2300/1087* (2013.01)

(56) References Cited

U.S. PATENT DOCUMENTS

| | | | |
|---|---|---|---|
| 5,139,261 A * | 8/1992 | Openiano | 463/36 |
| 5,883,690 A * | 3/1999 | Meyers et al. | 345/161 |
| 5,976,018 A * | 11/1999 | Druckman | 463/47 |
| 6,251,015 B1 | 6/2001 | Caprai | |
| 7,121,981 B2 | 10/2006 | Whitall et al. | |
| 8,360,882 B2 * | 1/2013 | Liu | 463/37 |
| 8,550,915 B2 * | 10/2013 | Ashida et al. | 463/37 |
| 8,568,233 B2 * | 10/2013 | Block et al. | 463/37 |
| 2003/0058220 A1 * | 3/2003 | Wang | 345/161 |
| 2007/0066394 A1 * | 3/2007 | Ikeda et al. | 463/37 |
| 2007/0258756 A1 * | 11/2007 | Olshausen | 403/274 |
| 2007/0265075 A1 * | 11/2007 | Zalewski | 463/36 |
| 2007/0281828 A1 | 12/2007 | Rice | |
| 2008/0090703 A1 | 4/2008 | Rosenberg | |
| 2009/0054145 A1 * | 2/2009 | Yang et al. | 463/37 |
| 2009/0098519 A1 | 4/2009 | Byerly | |
| 2009/0149256 A1 * | 6/2009 | Lui | 463/37 |
| 2009/0191967 A1 | 7/2009 | Konishi et al. | |
| 2009/0209343 A1 | 8/2009 | Foxlin et al. | |
| 2009/0253520 A1 * | 10/2009 | Lewis-Picard | 463/47 |
| 2009/0286654 A1 | 11/2009 | Rice | |
| 2010/0137105 A1 * | 6/2010 | McLaughlin | 482/8 |
| 2011/0195785 A1 * | 8/2011 | Ashida et al. | 463/37 |
| 2014/0121018 A1 * | 5/2014 | Burdea | 463/36 |
| 2014/0200085 A1 * | 7/2014 | Bares et al. | 463/47 |
| 2014/0235359 A1 * | 8/2014 | Navid | 463/47 |
| 2014/0274373 A1 * | 9/2014 | Olshan et al. | 463/31 |
| 2014/0317329 A1 * | 10/2014 | Barnett et al. | 710/304 |
| 2015/0157949 A1 * | 6/2015 | Durling, Jr. | 463/47 |

FOREIGN PATENT DOCUMENTS

WO  WO 2004/004841  1/2004
WO  WO 2009/013679  1/2009

OTHER PUBLICATIONS

European Patent Application No. 11759778.1: European Search Report dated Oct. 22, 2013, 7 pages.

New Zealand Patent Application No. 584146: Examination Report dated Mar. 30, 2011, 3 pages.

China Patent Application No. 201180015011.1; Office Action; dated Apr. 15, 2014; 13 pages.

Australia Patent Application No. 2011230070; Examination Report; dated Oct. 13, 2014; 3 pages.

Japan Patent Application No. 2013-501209; Official Action; dated Jun. 3, 2015; 5 pages.

* cited by examiner

EXERCISE SYSTEM AND CONTROLLER

CROSS-REFERENCE TO RELATED APPLICATIONS

This application is the National Stage of International Application No. PCT/NZ2011/000038, filed Mar. 23, 2011, which claims the benefit of New Zealand Patent Application No. 584146, filed Mar. 23, 2010, the disclosures of which are incorporated herein by reference in their entirety.

FIELD OF THE INVENTION

The present invention relates to an exercise system and controller. In particular, although not exclusively, the exercise system and controller is for facilitating rehabilitation exercises.

BACKGROUND TO THE INVENTION

A patient with hemiparesis is typically able to move one arm in a normal manner, but the other arm on the opposite side of their body is at least partially paralysed. In simple terms, the paralysis of the arm is caused by damage to the brain in areas that control the arm or that side of the body. Physically, there is actually nothing actually wrong with the paralysed limb. Neuroplastic recovery from brain injury and the rehabilitation of an affected arm by bilateral relearning and cortical remodeling is well known. Briefly, this involves retraining undamaged parts of the brain, which previously carried out different functions from controlling limbs, to control the paralysed limbs. Neuroplasticity is the fundamental issue that supports the scientific basis for treatment of acquired brain injury with goal-directed experiential therapeutic programs in the context of rehabilitation approaches to the functional consequences of the injury.

Some exercise devices have been developed to assist with the retraining rehabilitation for the affected limbs. One example is the bilateral arm trainer proposed in U.S. Pat. No. 7,121,981. This bilateral arm trainer comprises a pair of sliding tracks along with a pair of handles that can slide back and forth along a respective track. The handles can be either yoked or unyoked and arm exercises involving repetitive push and pull movements by sliding the handles back and forth along the track are used in the rehabilitation process.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide an exercise system and/or exercise controller for use in rehabilitation, or to at least provide the public with a useful choice.

SUMMARY OF THE INVENTION

In a first aspect, the present invention broadly consists in an extension handle for a motion-sensing game controller, comprising:
an elongate handle member extending between spaced-apart left and right ends, the handle member providing hand grips and/or grip surfaces at or toward each end of the handle member for gripping by left and right hands of a user and having a mounting system for releasably coupling the handle member to a motion-sensing game controller.

Preferably, the handle member is provided with one or more hand securing systems that are operable to secure one or each hand of the user to the respective grip(s) or grip surfaces of the handle member. In one form, the hand securing system may comprise a wrist fastening strap provided at or toward the grips or grip surfaces of the handle member. Preferably the wrist fastening strap is formed from elastic self adhesive material. In one form, the wrist fastening straps may be configured to allow free wrist movement when the extension handle is in use, or alternatively may be configured to constrain wrist movement when the extension handle is in use.

In one form, the game controller itself may form one of the hand grips when coupled to the handle member.

Preferably, the mounting system for the motion-sensing game controller is configured to allow for the orientation or position of the game controller to be adjusted relative to the handle member. By way of example, the mounting system is configured to allow the game controller to be rotated about or relative to the handle member.

Preferably, the mounting system is located at or toward one end of the handle member such that, in use, the game controller is coupled at or toward an end of the extension handle.

Alternatively, the mounting system is located intermediate the length of the handle member.

Preferably, the handle member is adjustable in length. In one form, the handle member is telescopically adjustable in length. For example, the handle member may comprise first and second sub-members that are coupled in a slidable arrangement relative to each other to allow for overall telescopic length adjustment of the handle member.

Preferably, the extension handle is weight adjustable. In one form, one or more weights are coupled to or integrated within the handle member. In another form, the handle member may be substantially hollow and the one or more weights may be sealed within the handle member.

In one form, the extension handle is untethered or unsupported, and is freely moveable in 3D space by a user into any position and orientation.

In another form, the extension handle further includes a support mechanism that is arranged to support the handle member against gravity but while allowing for full movement of the extension handle into any position and orientation within a 3D space.

Preferably, the support mechanism may be fixed or coupled to a fixed surface or structure at one end and coupled at the other end to the handle member. In one form, the support mechanism may comprise a flexible but semi-rigid spring extending between the hand member and the fixed structure or surface. The couplings of the ends of the spring with the handle member and the fixed structure respectively may be rigid couplings or alternatively rotatable or pivotable couplings allowing varying degrees of freedom of movement to the extension handle in 3D space.

Preferably, the handle member is of sufficient length to provide spaced-apart grips or grip surfaces for the left and right hands of the user. In one form, the grips or grip surfaces are approximately a shoulder-width apart with respect to the user.

In a second aspect, the present invention broadly consists in an exercise controller comprising:
an elongate handle member extending between spaced-apart left and right ends, the handle member providing grips and/or grip surfaces at or toward each end of the handle member for gripping by left and right hands of a user; and a motion-sensing game controller coupled to the handle member and which generates motion signals representing motion of the game controller in 3D space.

In one form, the game controller is permanently coupled or integrated with the handle member. In another form, the game controller is releasably coupled to the handle member.

Preferably, the game controller is coupled to the handle member at or toward one of its ends. Alternatively, the game controller is coupled to the handle member intermediate the length of the handle member.

The elongate handle member of the exercise controller may have any one or more features mentioned in respect of the handle member of the first aspect of the invention.

In a third aspect, the present invention broadly consists in an exercise system for facilitating exercise by a user comprising:

an exercise controller of the second aspect of the invention in which the game controller generates motion signals in response to movement of the exercise controller in 3D space by a user; and an electronic gaming system providing a visual interactive game for the user and which receives and processes the motion signals from the exercise controller such that the user may interact with the gaming system by moving the exercise controller in 3D space.

Preferably, the gaming system is operatively connected (in signal communication), either wirelessly or via hardwiring, to the exercise controller.

Preferably, the gaming system includes a gaming console or engine for operating the visual interactive game and a display screen for displaying the game to the user.

The third aspect of the invention may have any one or more features mentioned in respect of the first and second aspects of the invention.

In a fourth aspect, the present invention broadly consists in an elongate extension handle for a motion-sensing game controller being fixable at one end to the game controller, which in use is held by one hand of a user, and a hand grip or grip surface being provided at or toward the other end of the handle member for gripping by the user's other hand.

The fourth aspect of the invention may have any one or more features mentioned in respect of the first-third aspects of the invention.

In a fifth aspect the invention may broadly be said to consist of an exercise system for facilitating exercise by a user comprising:

an elongate handle member extending between spaced-apart left and right ends, the handle member providing grips and/or grip surfaces at or toward each end of the handle member for gripping by left and right hands of a user; and a motion-sensing device which generates motion signals representing motion of one or more objects associated with the handle member in 3D space.

The one or more objects may be any one or more of the user's hands, the handle member or any part thereof such as a grip surface, or a separate object coupled to the handle member.

Preferably, the exercise system further comprises an electronic gaming system providing a visual interactive game for the user and which receives and processes the motion signals from the motion-sensing device such that the user may interact with the gaming system by moving the handle member in 3D space.

Preferably, the gaming system is operatively connected (in signal communication), either wirelessly or via hardwiring, to the motion-sensing device.

Preferably, the gaming system includes a gaming console or engine for operating the visual interactive game and a display screen for displaying the game to the user.

In one form the motion sensing device is a 3D motion scanner separate and remotely located from the handle member. The scanner may comprise a camera and/or infrared laser projector for providing 3D motion capture capability. The scanner may be an XBOX KINECT™ scanner for example.

In an alternative form the motion sensing device is a motion-sensing game controller coupled to the handle member and which generates motion signals representing motion of the game controller in 3D space. In this form, the motion sensing controller may have any one or more features mentioned in respect of the first-fourth aspects of the invention.

In either form of the fifth aspect, the elongate handle member may have any one or more features mentioned in respect of the first-fourth aspects of the invention.

The term "member" as used in this specification and claims, unless the context suggests otherwise, is intended to cover a single unitary member or a member collectively provided by two or more sub-members or parts operatively coupled or connected together.

The phrase "motion-sensing game controller" as used in this specification and claims, is intended to mean, unless the context suggests otherwise, any customised or generic electronic handheld game controller or game remote that is configured or that is configurable to sense motion of itself in 3D space and transmits motion signals representative of at least an aspect of that motion to an electronic gaming system, such as a corresponding gaming console, computer or the like, to enable a user to interact with an visual interactive game operating or run on the console, whether the controller or remote is hardwired or wirelessly connected to the gaming system, and including by way of example, but not limited to, the Nintendo Wii remote and Cywee Z controller or any other hand-held controller or remote or electronic device that includes motion-sensing capability such as a mobile or smart phone or PDA or the like, whether via onboard accelerometers and/or magnetometers or other motion sensing devices, that enable the user to interact with the gaming system by moving the position and/or orientation of controller or remote in 3D space.

The phrase "motion-sensing scanner" as used in this specification and claims, is intended to mean, unless the context suggests otherwise, any customised or generic device that is configured or that is configurable to sense motion of a nearby object in 3D space, whether optically via one or more cameras and/or infrared sensors or other remote motion sensing devices or motion tracking systems, and generate motion signals representative of at least an aspect of that motion for use by an electronic gaming system, such as a corresponding gaming console, computer or the like, to enable a user to interact with an visual interactive game operating or run on the console, whether the device is hardwired or wirelessly connected to the gaming system, and including by way of example, but not limited to, the XBOX KINECT™ scanner or any other motion sensing device.

The phrases "motion-sensing device" and "motion-sensing system" as used in this specification and claims, are intended to mean, unless the context suggests otherwise, any one or combination of the motion-sensing scanners and/or motion-sensing game controllers as defined above, configured or that are configurable to sense motion of one or more objects in 3D space and transmit motion signals representative of at least one aspect of that motion, and may include a single device or collection of separate components/devices interacting and/or communicating together to sense motion.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

The invention consists in the foregoing and also envisages constructions of which the following gives examples only.

BRIEF DESCRIPTION OF THE DRAWINGS

Preferred embodiments of the invention will be described by way of example only and with reference to the drawings, in which.

DETAILED DESCRIPTION OF PREFERRED EMBODIMENTS

General Overview

The present invention relates to an exercise system or an exercise controller and an exercise system using that controller for exercising a user's upper limb. The exercise system and/or controller are intended for use in rehabilitating patients suffering hemiparesis that causes one upper limb to be at least partially paralysed. For example, the exercise system and/or controller can be used for neuroplastic retraining rehabilitation techniques for enabling patients to regain control of their paralysed upper extremities, including shoulders, elbows, wrists and fingers, but primarily their shoulders and elbows via larger arm movements. Although the exercise device is primarily for rehabilitation of patients suffering hemiparesis, it will be appreciated that the exercise device may also be used by any person for bilateral training and exercising upper limbs.

Exercise System Overview

Figure 1:
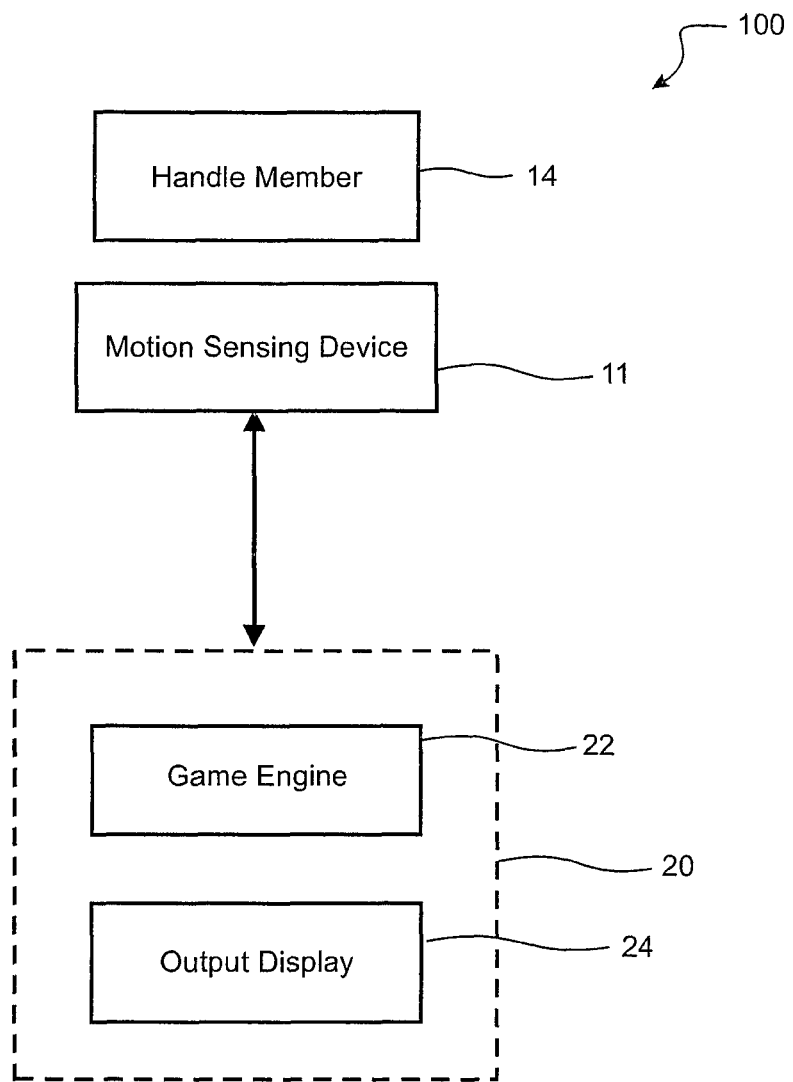
FIG. 1 shows an overall block diagram of an exercise system of the invention.

Referring to FIG. 1, the exercise system 100 broadly comprises a motion sensing device 11 for sensing three dimensional motion of a user of the system and interacting and controlling a game running on an interactive gaming system 20. 3D movement of a user, and in particular of one or both hands of the user is sensed by the motion sensing device 11, which in turn generates representative motion signals for sending to the interactive gaming system 20, thereby enabling the user to interact with the game by moving in the required/desired manner to affect game play. The exercise system 100 also comprises an elongate handle member 14 that may be integrated or coupled with the motion sensing device 11 or that may be separate and remotely located from the motion sensing device 11 and which is grip-able by both left and right hands of the user. The main function of the handle member 14 is to couple or link both hands of the user together in a bilateral manner during game-play. This forces the user to use large shoulder and elbow movements to cause the desired movement of the handle 14 to interact with the gaming system enabling the system to act as a rehabilitation exercise for shoulders and elbows. This has an advantage in terms of neuroplasiic recovery after a stroke for instance.

Figure 2A:
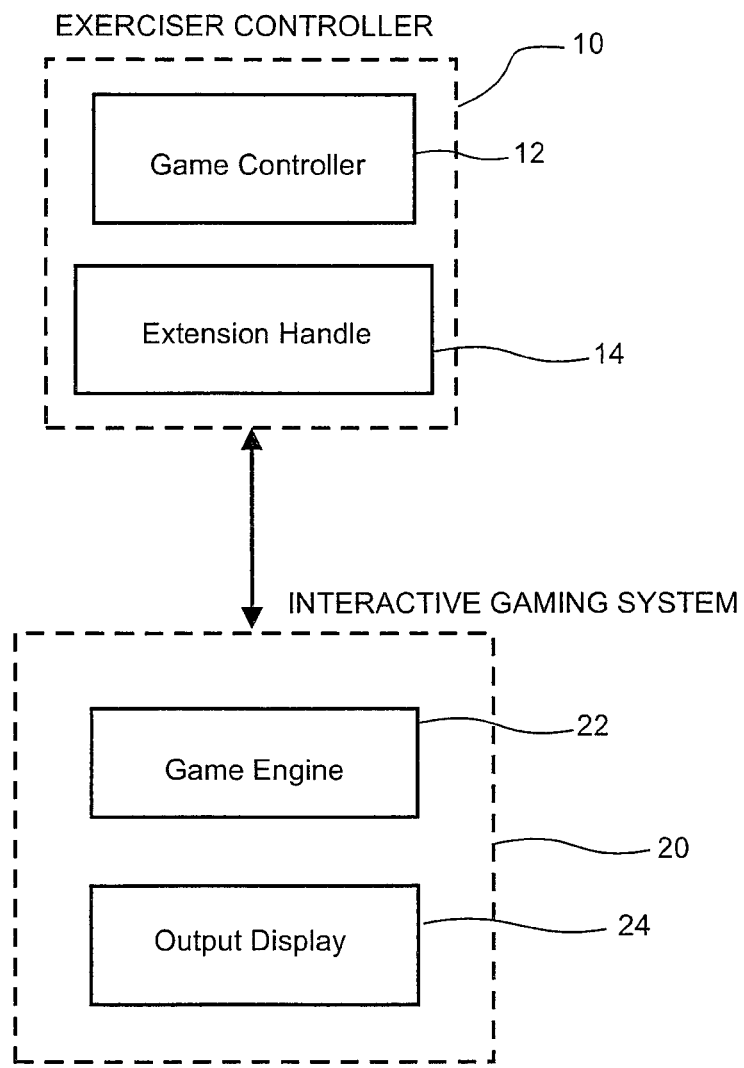
FIG. 2a shows an overall block diagram of an exercise system in accordance with a first embodiment of the invention.

Referring to FIG. 2a, in one embodiment, the exercise system 100 comprises a handheld exercise controller 10 that may be moved or manipulated as to its position and/or orientation in 3D space by both hands of a user to interact and control a game running on an interactive gaming system 20. In brief, the exercise controller comprises a game controller 12 that is arranged to sense motion of the exercise controller with respect to one or more aspects or 3D position and/or 3D orientation of the controller in 3D space and generate representative motion signals for sending to the interactive gaming system 20 to thereby enable the user to interact with the game by moving the exercise controller 10. The exercise controller 10 also comprises an extension handle 14 that is integrated or coupled with the game controller and which is grip-able by both left and right hands of the user. The main function of the extension handle 14 is to couple or link both hands of the user together during game-play and thereby force the user to use large shoulder and elbow movements of the extension handle to cause the desired movement of the game controller to interact with the gaming system as a rehabilitation exercise for shoulders and elbows.

In one form of the exercise controller embodiment of the exercise system 100, the extension handle 14 may be configured for retrofitting or releasably coupling to an existing motion-sensing game controller 12 that interacts with a corresponding gaming system or console. For example, the extension handle 14 may be coupled to a game controller 12 such as a Nintendo Wii or Cywee Z controller for use with the corresponding Nintendo and Cywee game consoles, or a mobile phone or smart phone with motion sensing capability. In other embodiments, it will be appreciated that the exercise controller 10 may be a customised device in which a motion-sensing game controller 12 is permanently fixed or integrated with the extension handle 14 and where the exercise controller is arranged to interact with the an interactive gaming system, whether a standalone gaming console or other computer gaming system, include game programs or software running of general purpose computes.

As mentioned above, the interactive gaming system 20 may be an existing gaming console that is configured to interact with a motion-sensing game controller, such as a Nintendo Wii console or Cywee game console, or any other gaming or computer-based system, including general personal computers that are configured for gaming. In brief the interactive gaming system will generally comprise a game engine 22 for running and operating the game, including processing the motion signals from the game controller and an output display 24 for displaying the game for interaction by the user. The game engine 22 may be provided in software, hardware, or any other programmable device.

Figure 2B:
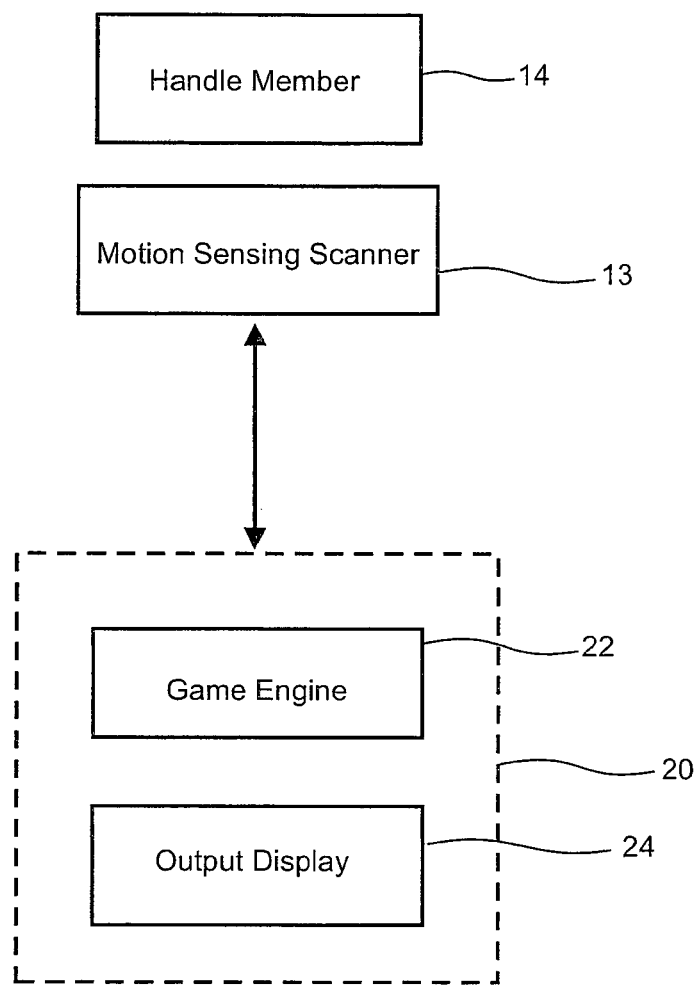
FIG. 2b shows an overall block diagram of an exercise system in accordance with a second embodiment of the invention.

Referring to FIG. 2b, in another embodiment, the exercise system 100 comprises a 3D motion scanner 13 separate and remotely located from the handle member 14. Manipulation of the position and/or orientation in 3D space of the handle member 14 by both hands of a user is sensed by the motion scanner 13 which in turn interacts and controls a game running on an interactive gaming system 20. The motion scanner 13 is arranged to sense motion of an object such as the user's hand(s) and/or the handle member 14 in 3D space and generate representative motion signals for sending to the interactive gaming system 20 to thereby enable the user to interact with the game by moving the handle member 14 in front of the motion scanner 13.

The motion scanner 13 may comprise any combination of necessary hardware components for tracking and translating motion of a moving object adjacent the scanner 13 into signals representative of the motion for reception and interpretation by a software system associated with a computer or gaming console. The motion scanner 13 may be an optical scanner that relies on line of sight and/or any other type of motion sensor. For example, the motion scanner 13 may comprise one or more stereoscopic cameras for capturing motion of the user, including for example their hands and/or arms when holding the handle member 14. In addition the motion scanner 13 may comprise an infrared laser projector which aids in capturing depth for the 3D video data. An example of a motion scanner with the above hardware is the MICROSOFT KINECT™. Any other type of motion scanner 13 capable of detecting 3D motion of a user without the need for handheld controllers can be used.

As mentioned above, the interactive gaming system 20 may be an existing gaming console that is configured to interact with the motion scanner 13, such as the XBOX 360™ scanner, or any other gaming or computer-based system, including general personal computers that are configured for gaming. In brief the interactive gaming system will generally comprise a game engine 22 for running and operating the game, including processing the motion signals from the motion scanner 13 and an output display 24 for displaying the game for interaction by the user. The game engine 22 may be provided in software, hardware, or any other programmable device.

Handle Member

Various forms of the handle member 14 of the invention will now be described generally. A game controller 36 is shown in some of the figures relating to this section for an example of a motion sensing device 11, however, the description of the handle member 14 and its use equally applies for other types of motion sensing devices 11.

Figure 3:
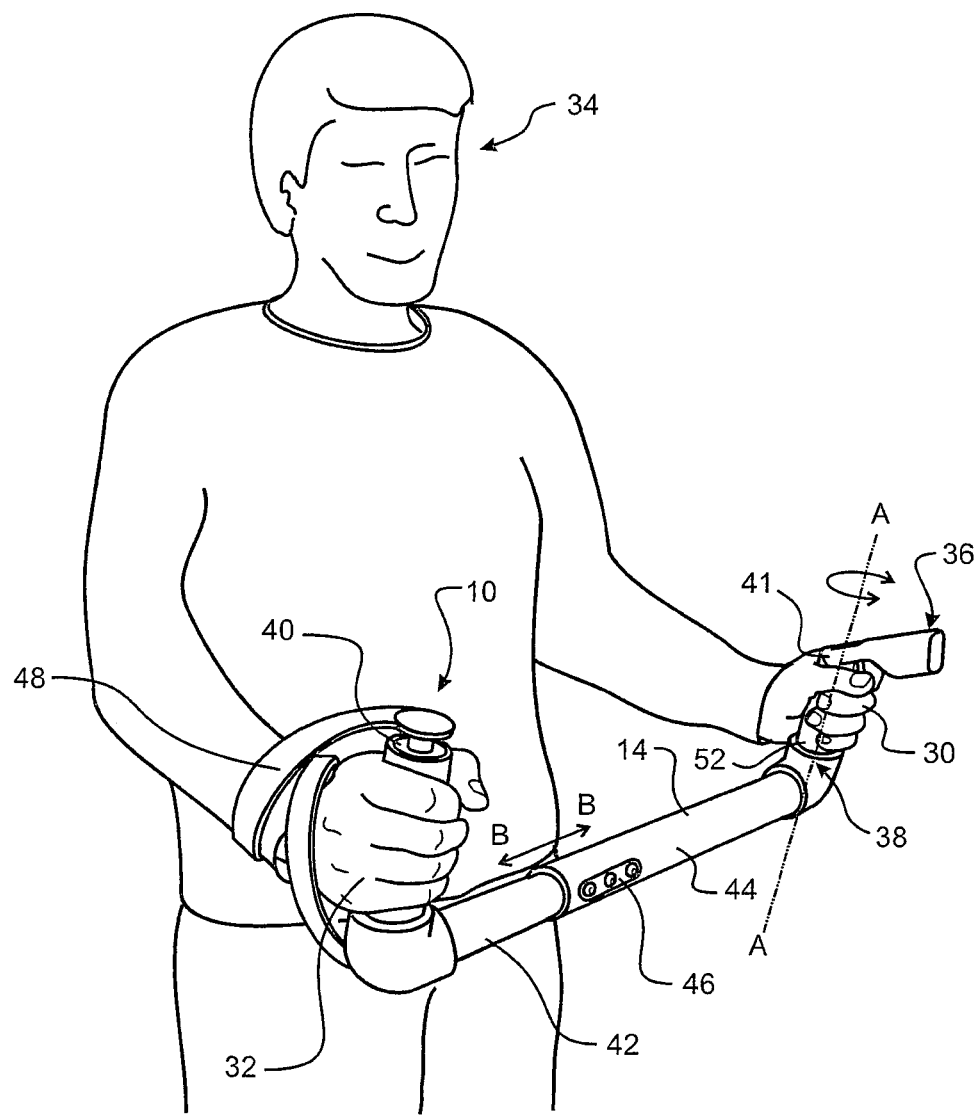
FIG. 3 shows a front-view of an exercise controller being held and operated by a user in accordance with the first embodiment of the invention.

Referring to FIG. 3, a handle member 14 is shown being held by a left 30 and right 32 hands of a standing user 34. The handle member 14 is substantially straight between its ends in this embodiment, although this is not essential.

The handle 14 extends between spaced-apart ends. The handle member 14 comprises one or more hand grips and/or grip surfaces for at least one hand, but preferably both the left and right hands of a user.

The overall length of the handle member 14 between the two ends may be fixed or alternatively adjustable, and preferably is of sufficient length to provide left and right hand grips or grip surfaces that are spaced-apart by approximately a shoulder-width of the user. As shown in FIG. 3, the handle member 14 is adjustable in length as shown by arrows BB. In this embodiment, the elongate handle member is telescopically adjustable in length and comprises a first sub-member 42 and a second sub-member 44 that are coupled to each other in a telescoping arrangement. For example, the second member 44 may be a hollow tube having a substantially circular cross-sectional shape and which is arranged for slidably receiving therein the first sub-member 42 having a complimentary circular cross-sectional shape of a slightly smaller diameter and which can be slidably extended or retracted relative to the second member 44. The sub-members 42, 44 may be locked together at the desired length by any operable locking mechanism, including for example, a series of apertures 46 provided along the second member 44 into which a spring-biased locking pin may be engaged, and which may be provided on the peripheral surface of the first sub-member 42 for co-operating with the complementary apertures 46. It will be appreciated that any other telescoping arrangement of one or more members to form the overall extension handle may be used.

In this embodiment, the handle members 42 and 44 are constructed of hollow rigid piping having a circular cross-sectional shape. It will be appreciated that the handle may have any other cross-sectional shape in other forms and may alternatively be provided in the form of a single unitary member in a non-length adjustable embodiment of the handle. It will be appreciated that the handle may either be substantially hollow along its entire length, partially solid along its length, or entirely solid along its length depending on requirements. Various materials may be utilised to form the handle member, and any of its sub-members, including, but not limited to, a plastic polymer, aluminium, wood, metal, or any other suitable rigid or semi-rigid material.

Figure 4A:
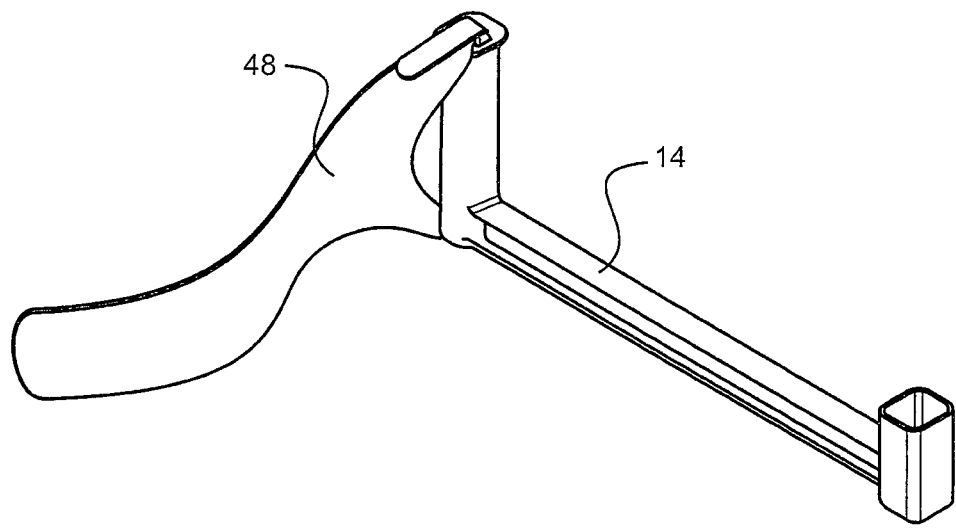
FIG. 4a is perspective views of a handle member of the invention incorporating a wrist strap.
Figure 4B:
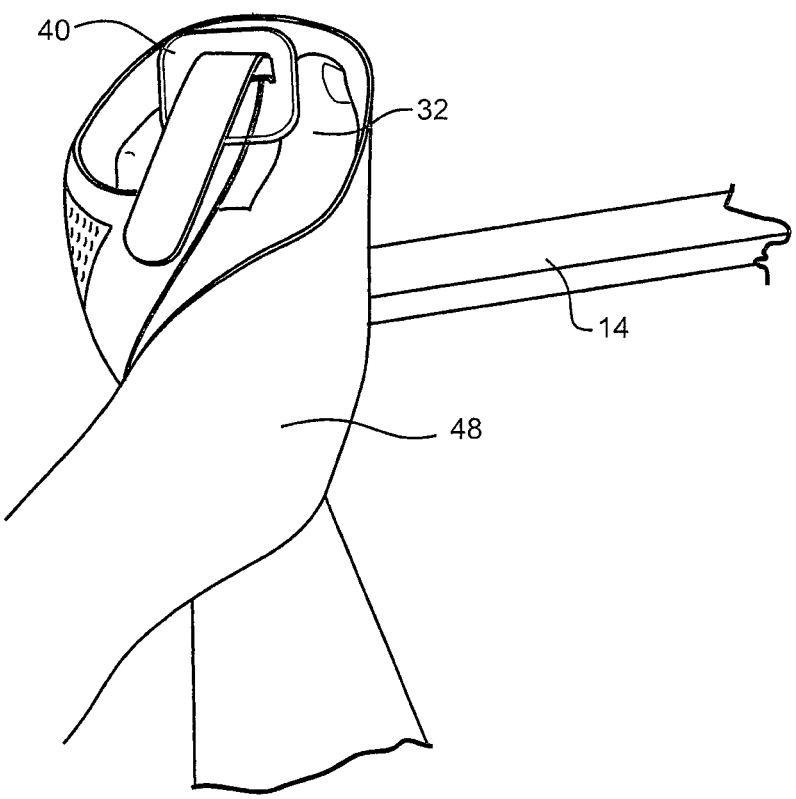
FIG. 4b shows the wrist strap in use part way through attachment to a user's wrist.
Figure 4C:
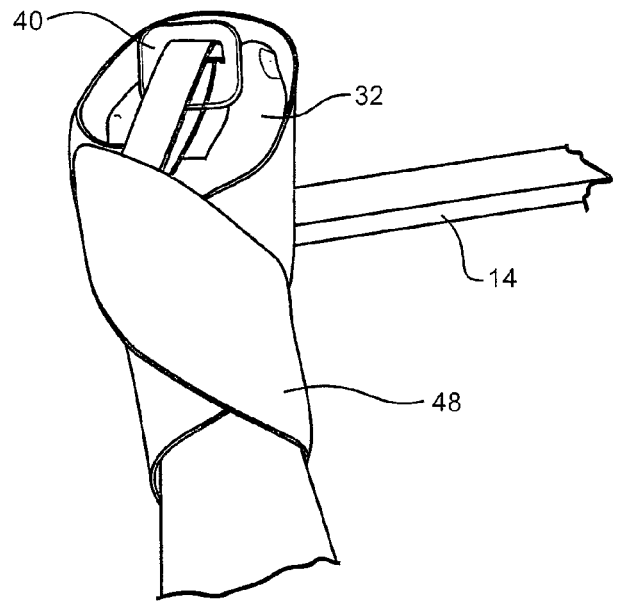
FIG. 4c shows the wrist strap in use and fully attached to the user's wrist.

Referring now also to FIGS. 4a-c, a hand securing system 48 may be provided for one, a selection or all grip surfaces or hand grips of the elongate handle 14. Each hand securing system 48 is operable to secure the hand to the grip surface or hand grip of the handle 14. A hand securing system in the form of a releasable securing wrist strap 48 for the user's right hand 32 on the upright handgrip 40 is shown. The wrist strap may be either used to assist the user to grip the handle and may be either configured as a stiffness strap to constrict the movement of the user's wrist relative to the handle or alternatively allow for free movement of the wrist relative to the handle in other embodiments. The wrist strap may be formed from elastic material or non-elastic material, or a combination of both. In one form, the wrist strap may comprise a fastening system in the form of a self adhesive material such as a hook and loop fastener (e.g. of the type sold under the brand name Velcro). The strap is operable to securely grip the wrist, possibly similar to a skateboard wrist protector, but with the front of the strap connected to the handgrip or handle 14. FIGS. 4b and 4c show the process of wrapping the wrist strap 48 around the user's hand 32 to form a figure eight strap. In this embodiment, the wrist strap is elastic to cater for different size users, although this is not essential. Alternatively the wrist strap does not comprise self adhesive material and may comprise any other form of fastening system, such as a buckle or clipping mechanism for fastening the strap. Any other known method for fastening the wrist strap may be used. The hand securing system may alternatively be formed from a rigid plastics material that clamps about the users wrist.

In some embodiments of the exercise system 100, an adjustable weight system may be provided to adjust the overall weight of the handle to thereby increase or reduce the effort required during game play. The weight system may comprise one or more weights that can be coupled or integrated to or within the handle 14 for adjusting the weight. The weights may comprise any solid or liquid mass. In one form, a hollow handle 14 may be sealed within to form a chamber of chambers and water may be introduced to the sealed chamber(s) inside the handle to increase the weight of the handle.

Figure 10A:
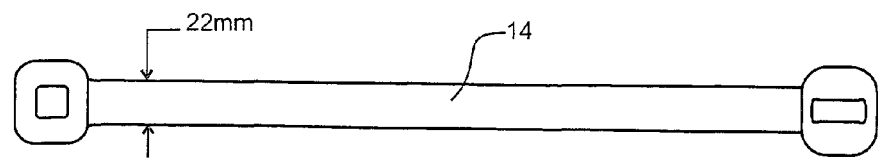
FIG. 10a-c show top, front and perspective views of the handle member respectively in accordance with the first embodiment of the invention.
Figure 10B:
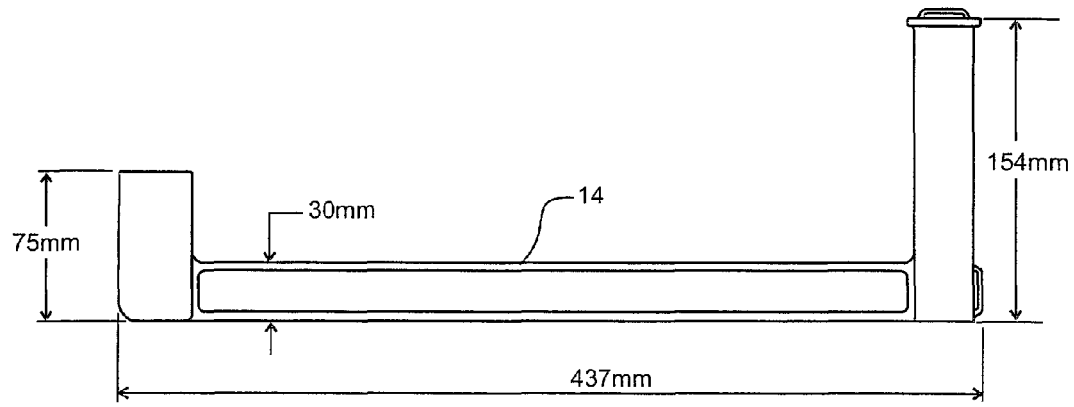
Figure 10C:
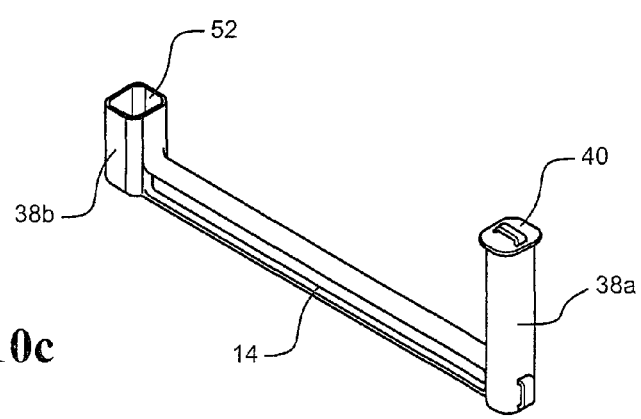

As shown, the handle member 14 is of sufficient length to provide grip surfaces and/or handgrips 40 and 41 for the user's hands that are spaced-apart and preferably enable the user to grip the handle 14 with both hands spaced apart by approximately a shoulder width. By way of example only, FIGS. 10*a-c* show dimensions in millimeters for a handle member 14 of one embodiment of the invention, although it will be appreciated that any other dimensions that enable sufficient shoulder and/or elbow movement during exercise could be used. It will be appreciated that difference sized or customised handle members could be provided for different users.

Figure 5:
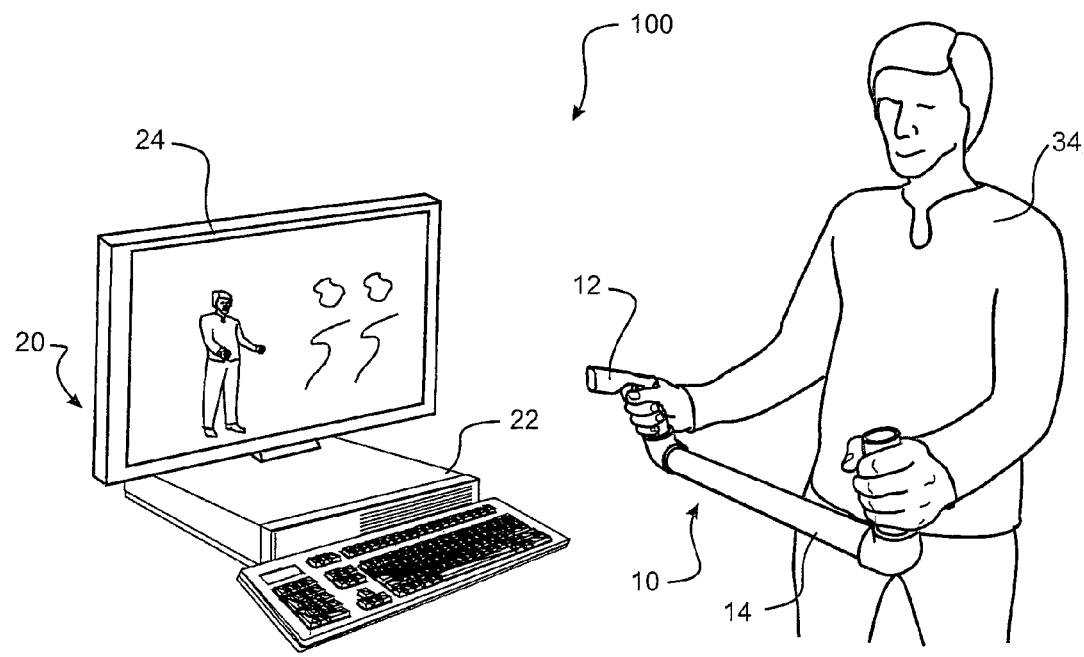
FIG. 5 shows a perspective view of an exercise system in use in accordance with the first embodiment of the invention.

Referring to FIG. 5, typical use of the handle member 14 within an exercise system 100 will be described.

The exercise system 100 is configured for bilateral exercise training of a user's upper limbs. As mentioned, the exercise system comprises an interactive gaming system 22 that may be controlled via movement of the handle member 14 in conjunction with a motion sensing device 12. In essence, the handle 14 links the user's two arms together and encourages large arm movements, including elbow and/or shoulder movements, in order to cause the required motion for the motion sensing device 12 to interact with the games. It will be appreciated that various different types of games may be displayed on the interactive gaming system 20 and interaction and game play will require manipulation and movement of the handle 14 by both the user's arms in order to interact with the game and achieve the desired task or progress from level to level.

The exercise system is preferably suited for use by patients that are suffering from a neurological injury and who are undergoing rehabilitation by carrying out bilateral exercises. For example, the system is suited for use by someone suffering from hemiparesis as a result of a stroke and where the patient is often left with one affected arm and one unaffected arm. Referring to FIG. 3, the user 34 is shown with their left unaffected arm gripping one end of the handle 14 while the partially paralysed right arm grips or is securely strapped to the other end of the handle member at handgrip 40. With this arrangement, the user's left able-bodied arm is connected to the affected arm and can be used to guide and assist the affected arm.

As shown in FIG. 5, the handle 14 in this embodiment is untethered and freely moveable in any position and/or orientation in 3D space. The user 34 holds the handle with both their left and right hands, including securing strap where necessary for an affected hand or arm to assist grip, and are preferably spaced approximately a shoulder width apart. The user is then required to manipulate the position orientation of the handle via largish shoulder and elbow movements.

The motion sensing device 12 operates as usual by sensing one or more aspects of the motion, which may include any one or more of the vertical, horizontal and/or rotational movements with respect to its 3D position and/or 3D orientation in 3D space, and transmits representative motion signals to the interactive gaming system 20, such as the gaming console 22, to interact with the game displayed on the screen 24.

Figure 6A:
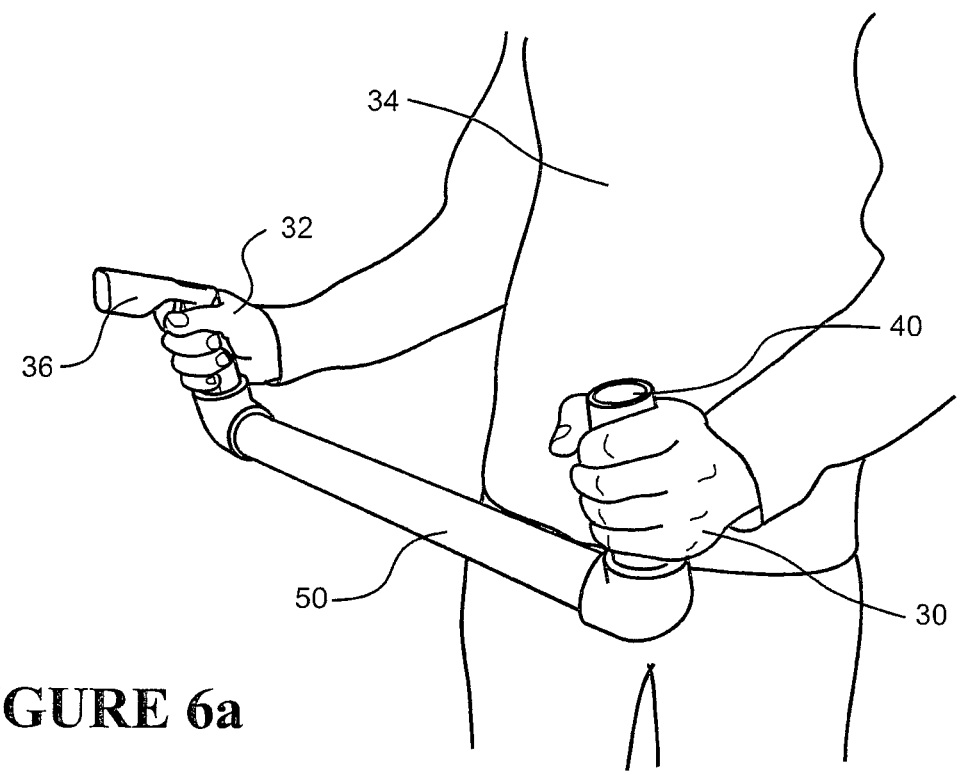
FIGS. 6A and 6B show an exercise controller being held with different hand configurations by a user for particular rehabilitation exercises.
Figure 6B:
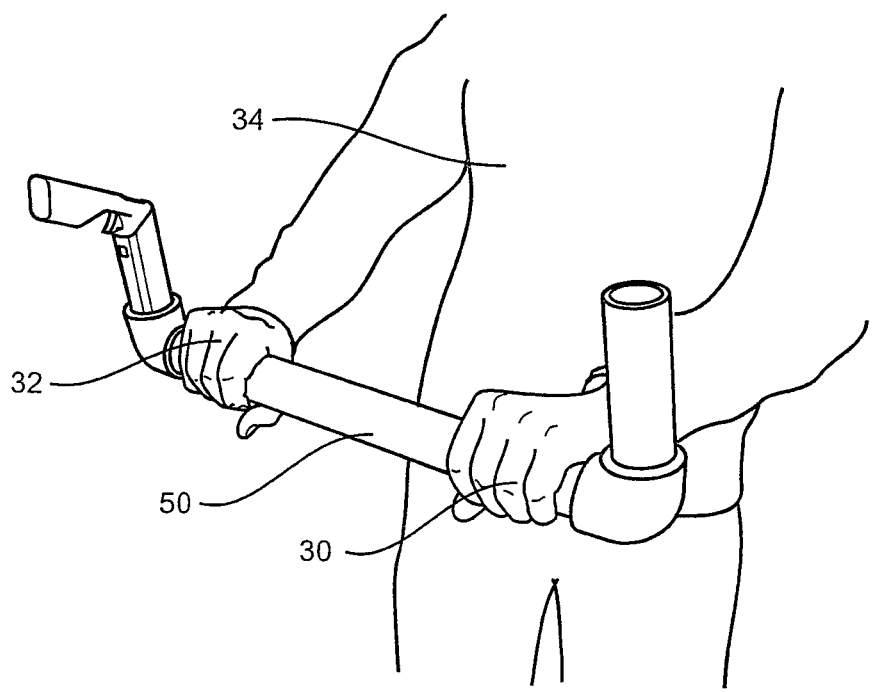

FIGS. 6A and 6B show different configurations for holding the handle member 14. As shown in FIG. 6B, the user need not necessarily grip the handgrip 40 but may employ other means of hand configurations where the user grips handgrip surfaces on the lateral handle member, which may simply be provided by the peripheral circumferential surface of the handle member in this embodiment and as shown in FIG. 6B. These different handgrip configurations can be selected and customised for each patient to focus on different joint movements during game play.

It will be appreciated that the exercise controller may be employed by any person undertaking bilateral exercise training, whether suffering from hemiparesis or not. The exercise controller can also be used simply for entertainment.

Exercise Controller Embodiment

The exercise controller embodiment and various forms thereof will now be described with reference to FIGS. 3-7 and 10*a-c*. By way of example only, the exercise controller will be described in the context of an extension handle 14 that is retrofitted to a commercially available game controller, such as a Cywee Z controller.

Referring to FIGS. 3 and 5, an exercise controller 10 is shown being held by a left 30 and right 32 hands of a standing user 34. The gaming system 20, including the visual display screen 24 is in front of the user. The exercise controller 10 comprises an extension handle 14 that is retrofitted or coupled to a motion-sensing game controller (12 in FIG. 5), such as a Cywee Z controller 36.

Referring now also to FIGS. 10*a-c*, the extension handle 14 comprises an elongate handle member extending between spaced-apart ends 38*a* and 38*b*. The handle member comprises one or more hand grips and/or grip surfaces for at least one hand, but preferably both the left and right hands of a user as explained in further detail by way of example with reference to FIGS. 6A and 6B later.

The handle member is provided with a mounting system that is operable to receive and retain or to otherwise secure the game controller 36 to the handle member. The mounting system may be provided at or toward one or both ends of the handle member, or alternatively intermediate of the ends in other embodiments. As shown in FIG. 3, the mounting system is provided at the left end 38*b* of the handle member. In this form, the gaming controller 36 is releasably retained and received in a complimentary aperture 52 provided in the end of the handle member. The game controller may be secured in the mounting aperture 52 by a friction fit hold, an operable clamp, or any other securing mechanism. In one form, the inner surface of the mounting aperture 52 may be provided with a resiliently deformable material, such as rubber or foam, to hold the game controller in place. It will be appreciated that any other mounting system or operable clamping mechanism for coupling the game controller 36 to the extension handle could be used in alternative embodiments. The mounting system may be configured for either coupling to the game controller at a fixed position and orientation relative to the extension handle or alternatively an adjustable mounting system enabling the position and orientation of the game controller 36 to be selectively adjusted relative to the extension handle. For example, in one form the mounting system may be configured to allow rotation of the game controller about axis AA such that the game controller, and overall exercise controller, can be rotated for left handed or right handed use. For example, the mounting system may enable the game controller to be rotated about an axis substantially transverse to the longitudinal axis of the handle member.

In this embodiment, the extension handle comprises an elongate handle member which in use extends laterally between spaced-apart left 30 and right 32 hands of the user. In one form of the embodiment, one end 38b of the handle member is provided with the mounting system for coupling to or mounting of the game controller 36. The other end of the handle member 38a may be provided with a hand grip 40 having a substantially upright or transverse orientation relative to the longitudinal axis of the laterally extending handle member.

Figure 7:
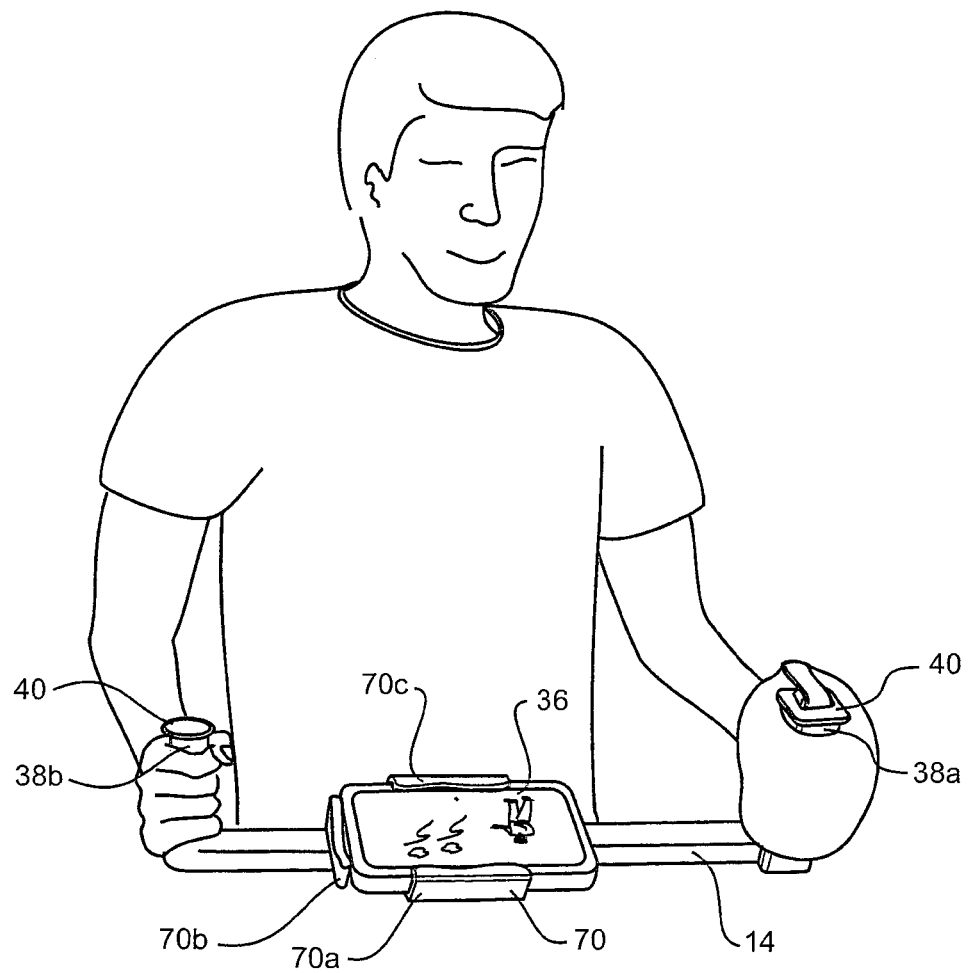
FIG. 7 shows a front view of an exercise controller incorporating a mobile phone in accordance with another embodiment of the invention.

Referring to FIG. 7, in an alternative form of this embodiment, a mounting system 70 is provided intermediate the two ends 38a and 38b for the game controller 36. The game controller 36 is shown mounted along handle member 14. The game controller may be a smart phone 36 having motion sensing and communication capability built in for detecting motion of the phone 36 and transmitting data indicative of the motion to the gaming system 20. The mounting system may be a universal phone mount 70 having a base section and multiple supports 70-c extending laterally from multiple sides/ends of the base section for receiving and retaining the phone 36 therebetween. The base section may be screwed onto the handle member 14 or otherwise mounted either along the longitudinal axis of the handle 14 (as shown) or alternatively transversely to the longitudinal axis or at any other angle relative to the longitudinal axis of the handle 14.

The base and/or supports and the handle member 14 may be a single integral unit. In this form of the embodiment, both ends 38a and 38b of the handle member 14 are provided with a hand grip 40 having a substantially upright or transverse orientation relative to the longitudinal axis of the laterally extending handle member. The disabled hand of the user at 38a may be strapped or otherwise attached to the grip 40.

As described in more detail above with reference to FIGS. 3 and 10a-c, the overall length of the handle member between the two ends 38a and 38b may be fixed or alternatively adjustable, and preferably is of sufficient length to provide left and right hand grips or grip surfaces that are spaced-apart by approximately a shoulder-width of the user.

Referring to FIGS. 6A and 6B, a non-length adjustable embodiment of the exercise controller is shown. In this embodiment, the lateral elongate handle member 50 comprises one single integral elongate component, such as a length of rigid piping, although a solid member may be used in alternative embodiments. As shown in FIGS. 6A and 6B, the user may use various handgrip configurations to hold the exercise controller for use in interacting with the gaming system associated with the game controller 36. In FIG. 6A, the user's right hand 32 grips the hand controller 36 which has a substantially transverse orientation relative to the lateral handle member 50. Likewise, the user's right hand 30 grips an upright handgrip 40 located at the other end of the handle member. No hand securing systems are shown in FIG. 6A, but either or both the handgrip 40 and game controller 36 may have an associated hand securing system as previously described. This holding configuration focuses the movement of the user on elbow flexion and shoulder movement to cause up and down movements of the game controller during game play.

In contrast, FIG. 6B shows the user 34 holding the exercise controller by both the left 30 and right 32 hands gripping the grip surfaces provided by the lateral handle member 50 itself. In this holding configuration, wrist extension by the user controls the up and down movements of the game controller.

Operation of Exercise Controller

Referring to FIGS. 3 and 5, typical operation of the exercise controller 10 within an exercise system 100 will be described.

The exercise controller 10 is configured for bilateral exercise training of a user's upper limbs. As mentioned, the exercise system comprises an interactive gaming system 22 that may be controlled via movement of the exercise controller 10. In essence, the extension handle 14 coupled to the game controller 12/36 links the user's two hands together in a bilateral manner and encourages large arm movements, including elbow and/or shoulder movements, in order to cause the required motion of the onboard game controller 36 to interact with the games. It will be appreciated that various different types of games may be displayed on the interactive gaming system 22 and interaction and game play will require manipulation and movement of the extension handle 14 by both the user's arms in order to interact with the game and achieve the desired task or progress from level to level.

The exercise controller 10 is preferably suited for use by patients that are suffering from a neurological injury and who are undergoing rehabilitation by carrying out bilateral exercises. For example, the exercise controller is suited for use by someone suffering from hemiparesis as a result of a stroke and where the patient is often left with one affected arm and one unaffected arm. Referring to FIG. 3, the user 34 is shown with their left unaffected arm gripping the game console 36 while the partially paralysed right arm grips or is securely strapped to the other end of the handle member at handgrip 40. With this arrangement, the user's left able-bodied arm is connected to the affected arm and can be used to guide and assist the affected arm.

The exercise controller 10 in this embodiment is untethered and freely moveable in any position and/or orientation in 3D space. The user 34 holds the exercise controller with both their left and right hands, including securing strap where necessary for an affected hand or arm to assist grip, and are preferably spaced approximately a shoulder width apart. The user is then required to manipulate the position orientation of the game controller 36 via largish shoulder and elbow movements of the extension handle coupled to the game controller 36 during game play.

The game controller 36 operates as usual by sensing one or more aspects of the motion, which may include any one or more of the vertical, horizontal and/or rotational movements with respect to its 3D position and/or 3D orientation in 3D space, and transmits representative motion signals to the interactive gaming system, such as the gaming console, to interact with the game displayed on the screen. The game controller may also be provided with one or more buttons, switches or dials that the user may actuate during game play to further interact with the game and operation of these buttons causes further control signals to be sent to the interactive game.

As shown in FIG. 6B, the user need not necessarily grip the handgrip 40 and game controller 36, but may employ other means of hand configurations where the user grips handgrip surfaces on the lateral hand member, which may simply be provided by the peripheral circumferential surface of the handle member in this embodiment and as shown in FIG. 6B. These different handgrip configurations can be selected and customised for each patient to focus on different joint movements during game play.

It will be appreciated that the exercise controller 10 may be employed by any person undertaking bilateral exercise training, whether suffering from hemiparesis or not. The exercise controller 10 can also be used simply for entertainment.

Handle+Motion Scanner Embodiment

Figure 8:
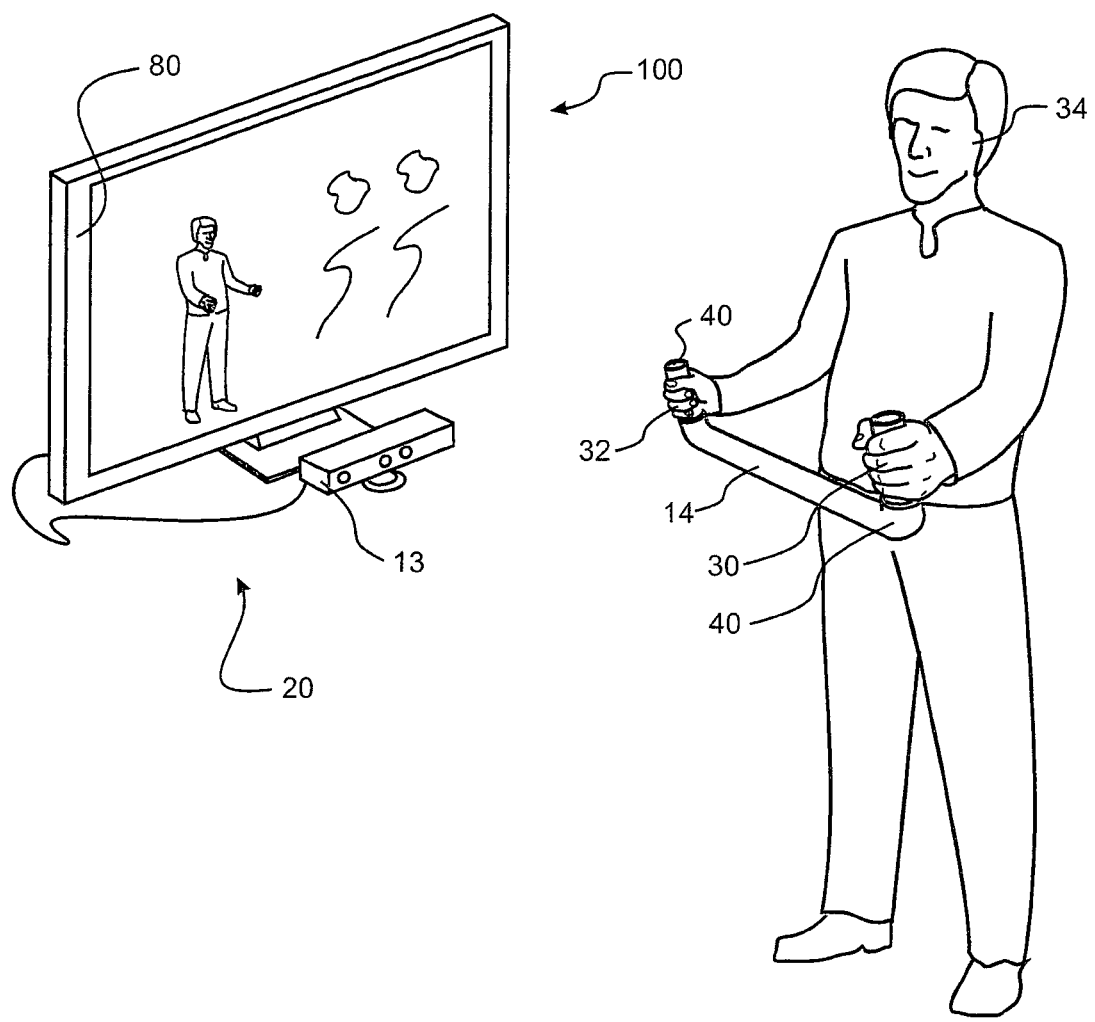
FIG. 8 shows a perspective view of an exercise system in use in accordance with the second embodiment of the invention.

In an alternative embodiment of the invention, the exercise system 100 consists of an elongate handle member 14 that is separate and remotely located from a motion scanner coupled to a game system as shown in FIG. 2b. Referring to FIG. 8, an elongate handle member 14 is shown being held by a left 30 and right 32 hands of a standing user 34. The gaming system 20 including the visual display screen 80 is shown in front of the user. The handle member 14 in this embodiment does not need to be retrofitted or coupled to a motion-sensing game controller. Instead a motion sensing scanner 13 is located adjacent the user 34 to determine the motion of the user 34 and in particular of the left 30 or right 32 hand of the user 34 or of the handle member 14.

As in the exercise controller embodiment, the handle 14 comprises an elongate handle member extending between spaced-apart ends. The handle member 14 comprises one or more hand grips and/or grip surfaces 40 for at least one hand, but preferably both the left and right hands of a user as shown in FIG. 5. The handle member in this embodiment is not provided with a mounting system for a controller.

As in previous embodiments, the user may use various handgrip configurations to hold the handle member 14 for use in interacting with the gaming system 20 associated with the motion scanner 13. Furthermore, hand securing systems may be provided as previously described.

The handle member 14 in combination with the motion scanner 13 is configured for bilateral exercise training of a user's upper limbs. As mentioned an interactive gaming system 22 may be controlled via movement of the handle member 14. In essence, the handle 14 adjacent the motion scanner 13 links the user's two hands together in a bilateral manner and encourages large arm movements, including elbow and/or shoulder movements, in order to cause the required motion to interact with games running on the gaming system 22. It will be appreciated that various different types of games may be displayed on the interactive gaming system 22 and interaction and game play will require manipulation and movement of the handle by both the user's arms in order to interact with the game and achieve the desired task or progress from level to level.

The handle is untethered and freely moveable in any position and/or orientation in 3D space. The user 34 holds the handle 14 with both their left and right hands, including securing strap where necessary for an affected hand or arm to assist grip, and are preferably spaced approximately a shoulder width apart. The user is then required to manipulate the position orientation of the handle 14 via largish shoulder and elbow movements during game play.

The motion scanner 13 operates as usual by sensing one or more aspects of the motion of one or more objects associated with the handle member, which may include any one or more of the vertical, horizontal and/or rotational movements of one of the hands of the user, or of both, or of the handle member 14 itself or any part thereof (such as one of the grip surfaces for instance) with respect to the 3D position and/or 3D orientation in 3D space of that object. The 3D motion is translated into representative motion signals that are in turn transmitted or used by the interactive gaming system 20, such as the gaming console, to interact with the game displayed on the screen. A separate object may be coupled to the handle member 14 (via a mounting system as in the game controller embodiment for example) that interacts with the motion scanner 13 to provide the motion signals. In other words, the motion scanner 13 may operate by detecting the motion of a specific object (the object may be visually or electronically unique—transmits at a certain frequency for instance) coupled to the handle member 14. The object may be an optical or electronic device or other type of physical device whose motion can be sensed by the scanner.

The motion scanner 13 may comprise any combination of necessary hardware components for translating motion of a moving object adjacent the scanner into signals representative of the motion for reception and interpretation by a software system associated with a computer or gaming console. For example, the motion scanner 13 may comprise one or more cameras for capturing motion of the user. In addition the motion scanner 13 may comprise an infrared laser projector which aids in capturing 3D video data. An example of a motion scanner with the above hardware is the XBOX KINECT™ scanner. Any other type of motion scanner 13 capable of detecting 3D motion of a user without the need for handheld controllers can be used. Preferably, in use the motion scanner 13 is located to capture movement of at least one of the user's hands.

It will be appreciated that the exercise system may be employed by any person undertaking bilateral exercise training, whether suffering from hemiparesis or not. The exercise system can also be used simply for entertainment.

Gravity Assisted Exercise System

A gravity assisted exercise system will now be described with reference to the exercise controller embodiment. It will be appreciated however that a similar configuration can be used for any embodiment of the invention discussed thus far.

Figure 9:
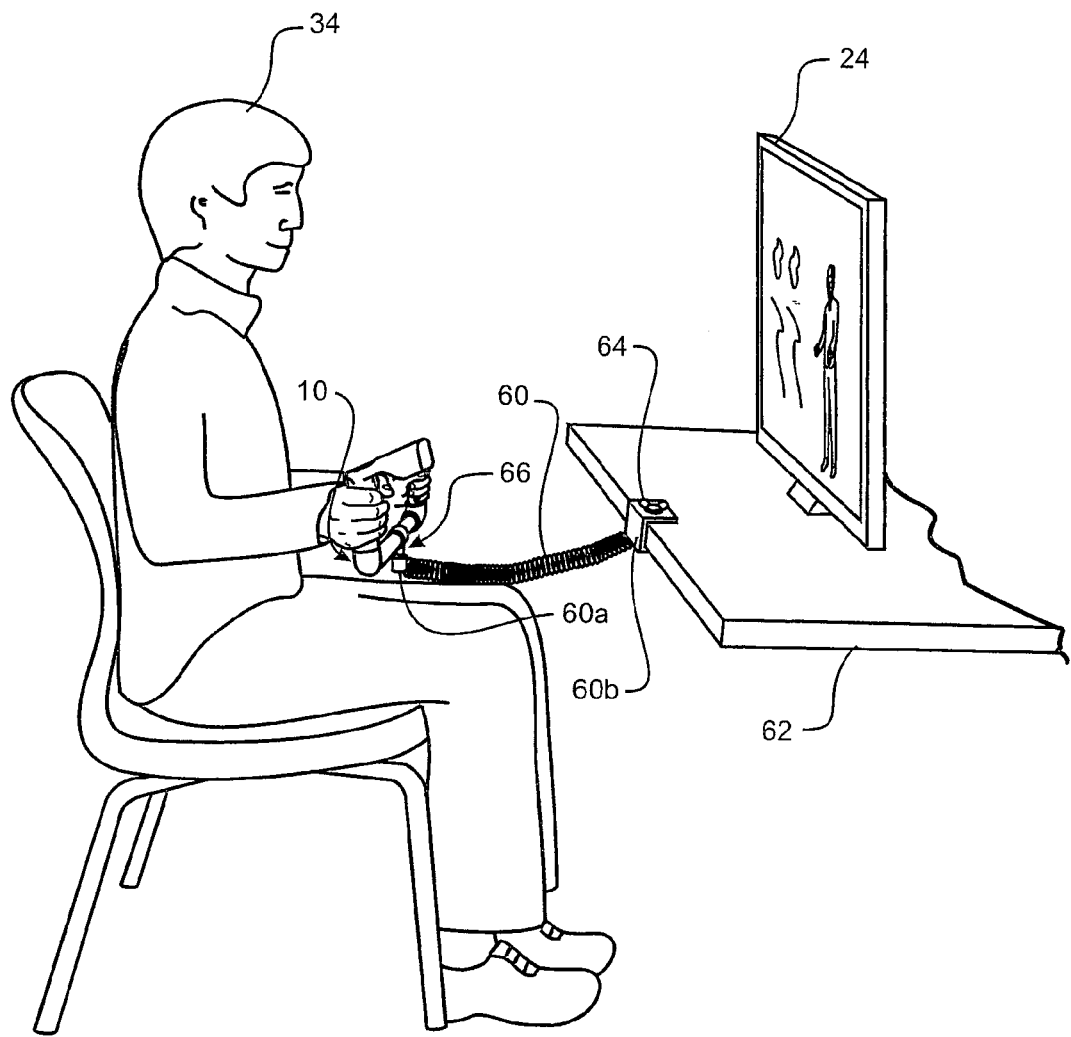
FIG. 9 shows a side-view of the exercise controller of the first embodiment in use and includes a gravity support mechanism in accordance with another embodiment of the invention.

With reference to FIG. 9, the exercise controller may be tethered and supported against gravity for use by people having limited strength to hold and manoeuvre exercise controllers on their own. In gravity supported embodiments, the exercise controller may additionally comprise a support mechanism that at least partially supports the weight of the exercise controller for the user. In one form, the support mechanism may comprise an overhead spring loaded support that is coupled between the elongate handle member and a fixed structure above the user, such as the roof. With this support mechanism, the user is still freely able to manipulate or manoeuvre the exercise controller in 3D space.

In another form as shown in FIG. 9, the user 34 may be seated in front of a display screen of the interactive gaming system 20. A semi-rigid spring member 60 may be coupled at one end 60a to the exercise controller and at the other end 60b to a fixed structure 62, such as a table, wall or the like. End 60b of the spring member may be coupled rigidly to the fixed structure via a screw clamp or any other mounting or mechanism of coupling 64. The other end 60a of the spring member 60 is preferably rotatably or pivotally coupled with a rotatable pivotal coupling 66, such as a gimbal, to the exercise controller, and for example centrally in the middle of the elongate handle member of the exercise controller 10. With this arrangement, the spring member 60 provides gravity support for the weight of the exercise controller but also enables the user to freely manipulate the position and orientation of the exercise controller in 3D space within limits defined by the length of the spring member 60 and nature of the coupling 66.

Advantages and Benefits

In some embodiments, the exercise controller and exercise system may comprise the following advantages and benefits.

In essence, the handle member couples the user's two hands and arms together and coordinated movement of both arms is required to cause a corresponding desired motion in the position and/or orientation of the coupled game controller 36 or of the tracked object to interact with the game as desired. As two hands are required to manipulate the position and/or orientation of the handle, this tends to force larger arm movements to interact with the game compared with conventional use of motion-sensing games, which may simply comprise one handed wrist movements of a game controller or in front of a motion scanner to interact with the game.

The purpose of the hand securing straps on one or both of the user's hands are two-fold. For affected limbs suffering from partial paralysis, the securing straps assist the user to grip the extension handle grip or grip surface. Additionally, one or both hands may be provided with a stiffening securing strap that constricts wrist movement relative to the handle and thereby further encouraging larger shoulder and elbow movements to create the corresponding desired motion to interact with the game.

The foregoing description of the invention includes preferred forms thereof. Modifications may be made thereto without departing from the scope of the invention as defined by the accompanying claims.

The invention claimed is:

1. A bilateral upper limb rehabilitation exercise device for bilateral exercising of a user's upper limbs, comprising:
    an elongate handle member having a length that extends between spaced-apart first and second ends, wherein the elongate handle member is untethered such that it is freely movable in 3D space by a user into any position and orientation;
    a hand grip provided at or toward the first end of the handle member for gripping by a first hand of the user, the hand grip extending from the handle member at a transverse orientation relative to a longitudinal axis extending between the ends of the handle member; and
    a mounting system provided at or toward the second end of the handle member that is configured to releasably couple a motion-sensing game controller at or toward the second end of the handle member for gripping by a second hand of the user in use,
    wherein the mounting system comprises a mounting aperture that is configured to releasably receive and retain a complementary portion of the game controller to couple it to the handle member such that the game controller extends out of the mounting aperture at a substantially transverse orientation relative to the longitudinal axis extending between the ends of the handle member for gripping by the second hand of the user, and wherein the mounting aperture is shaped to retain the complementary portion of the game controller in a plurality of selectable orientations relative to the handle member such that the orientation that the game controller is coupled to the handle member can be selectively adjusted relative to a rotation axis extending substantially transverse to the longitudinal axis extending between the ends of the handle member,
    the motion-sensing game controller being configured to generate motion signals representing motion of the game controller in 3D space as the handle member is moved in 3D space,
    wherein the hand grip and mounting system are spaced-apart on the handle member by approximately a shoulder-width of the user such that the user's first and second hands are linked by the handle member and spaced approximately a shoulder-width apart when gripping the hand grip at the first end of the handle member with their first hand and the game controller coupled at the second end of the handle member with their second hand, and such that the user can perform bilateral upper limb exercises with linked hands via movement of the handle member in 3D space.

2. A bilateral upper limb rehabilitation exercise device as claimed in claim 1 further comprising one or more hand securing systems that are operable to secure one or each hand of the user to the hand grip and/or game controller.

3. A bilateral upper limb rehabilitation exercise device as claimed in claim 1 wherein the handle member is adjustable in length.

4. A bilateral upper limb rehabilitation exercise device as claimed in claim 1 further comprising one or more removable weight elements for altering the weight of the extension handle.

5. A bilateral upper limb rehabilitation exercise device as claimed in claim 1 wherein the mounting aperture is configured to retain the complementary portion of the game controller via a friction fit hold.

6. A bilateral upper limb rehabilitation exercise device as claimed in claim 5 wherein the mounting aperture comprises an inner surface comprising a resiliently deformable material that is configured to hold the complementary portion of the game controller in place with a friction fit hold.

7. A bilateral upper limb rehabilitation exercise device as claimed in claim 1 wherein the mounting system further comprises an operable clamp that is configured to clamp the complementary portion of the game controller within the mounting aperture.

8. A bilateral upper limb rehabilitation exercise device as claimed in claim 1 wherein the motion-sensing game controller is operatively connected to an electronic gaming system that is configured to provide a visual interactive game for the user on a display screen and which receives and processes the motion signals from the motion-sensing game controller such that the user may interact with the gaming system by moving the handle member in 3D space.

* * * * *